5 Sheets—Sheet 1.

R. T. P. ALLEN.
TYPE DISTRIBUTING MACHINES.

No. 195,072. Patented Sept. 11, 1877.

WITNESSES:
A. W. Hart
Solon C. Kemon

INVENTOR:
R. T. P. Allen
BY
ATTORNEYS.

5 Sheets—Sheet 4.

R. T. P. ALLEN.
TYPE DISTRIBUTING MACHINES.

No. 195,072. Patented Sept. 11, 1877.

WITNESSES:

INVENTOR:
R. T. P. Allen
BY
ATTORNEYS.

N. PETERS, PHOTO-LITHOGRAPHER, WASHINGTON, D. C.

R. T. P. ALLEN.
TYPE DISTRIBUTING MACHINES.
No. 195,072. Patented Sept. 11, 1877.
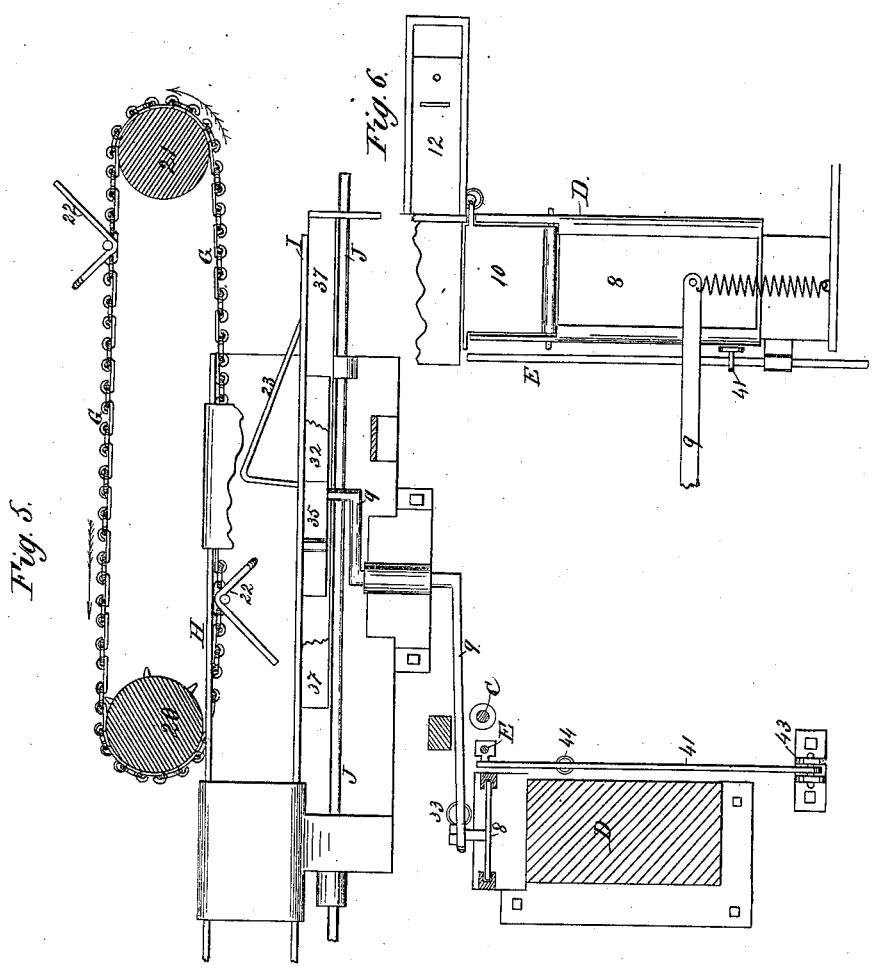

UNITED STATES PATENT OFFICE.

ROBERT T. P. ALLEN, OF FARMDALE, KENTUCKY.

IMPROVEMENT IN TYPE-DISTRIBUTING MACHINES.

Specification forming part of Letters Patent No. 195,072, dated September 11, 1877; application filed January 27, 1877.

*To all whom it may concern:*

Be it known that I, ROBERT T. P. ALLEN, of Farmdale, in the county of Franklin and State of Kentucky, have invented a new and Improved Type-Distributer; and I do hereby declare that the following is a full, clear, and exact description of the same, reference being had to the accompanying drawing, forming part of this specification, in which—

Figure 1:
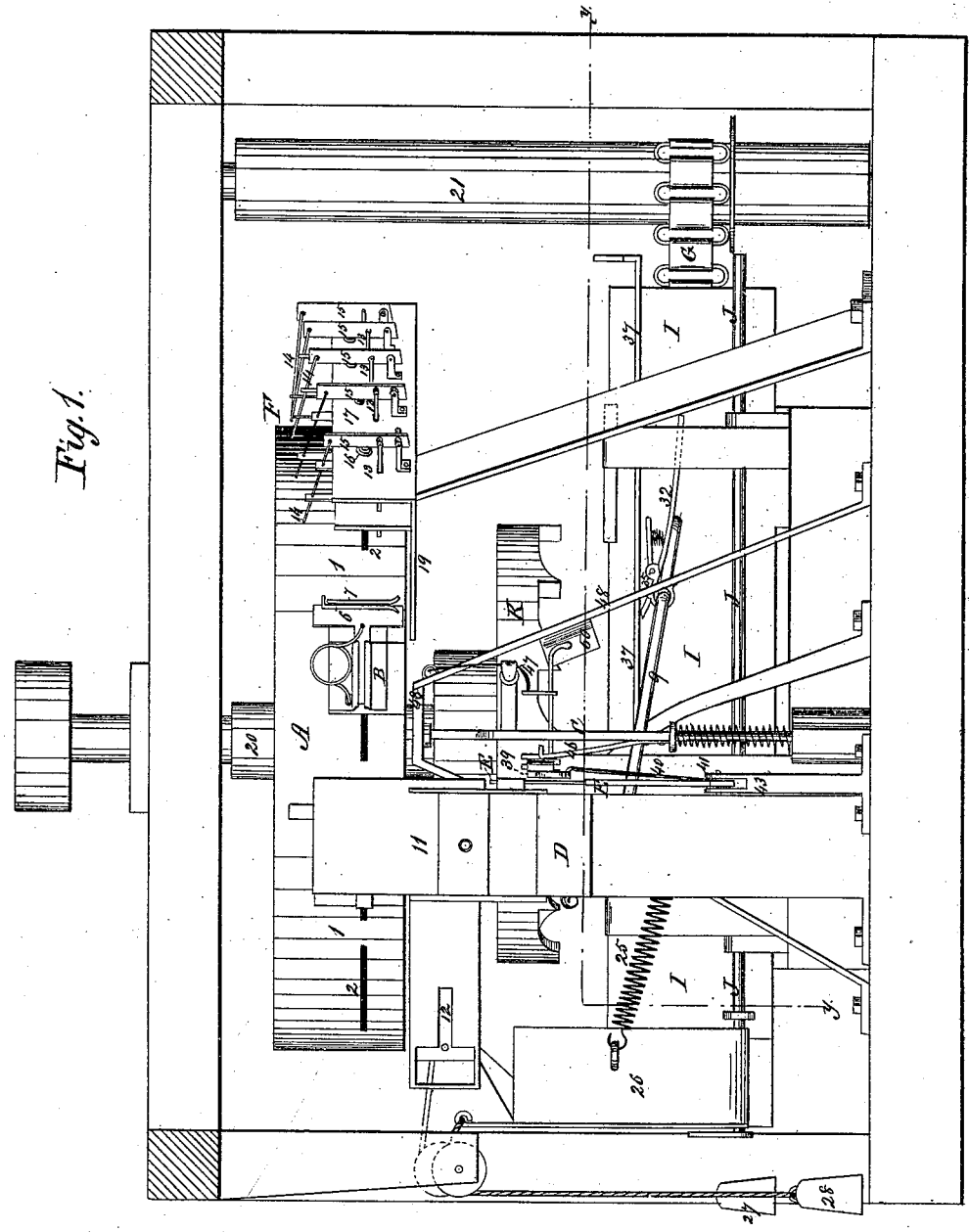
Figure 2:
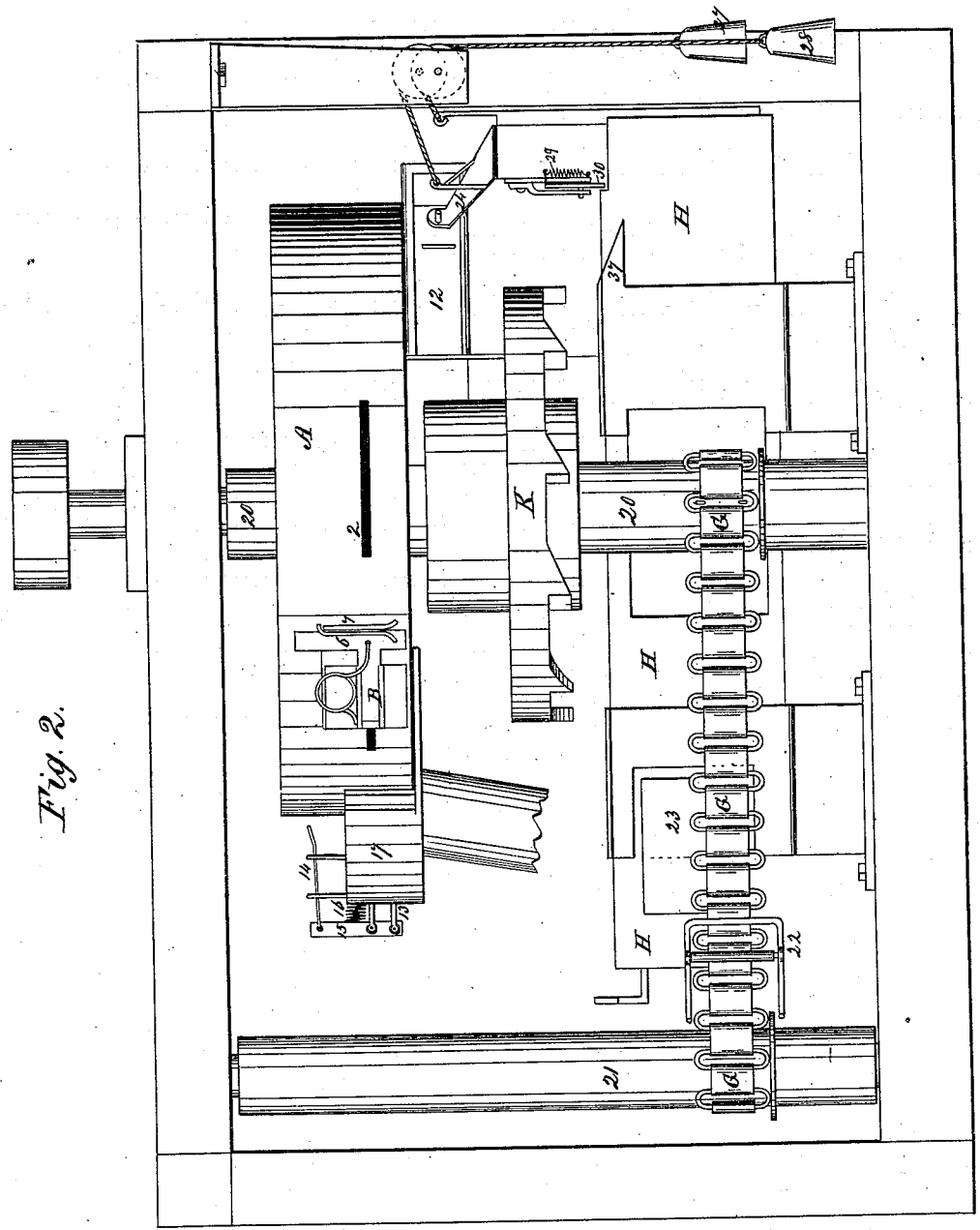
Figure 3:
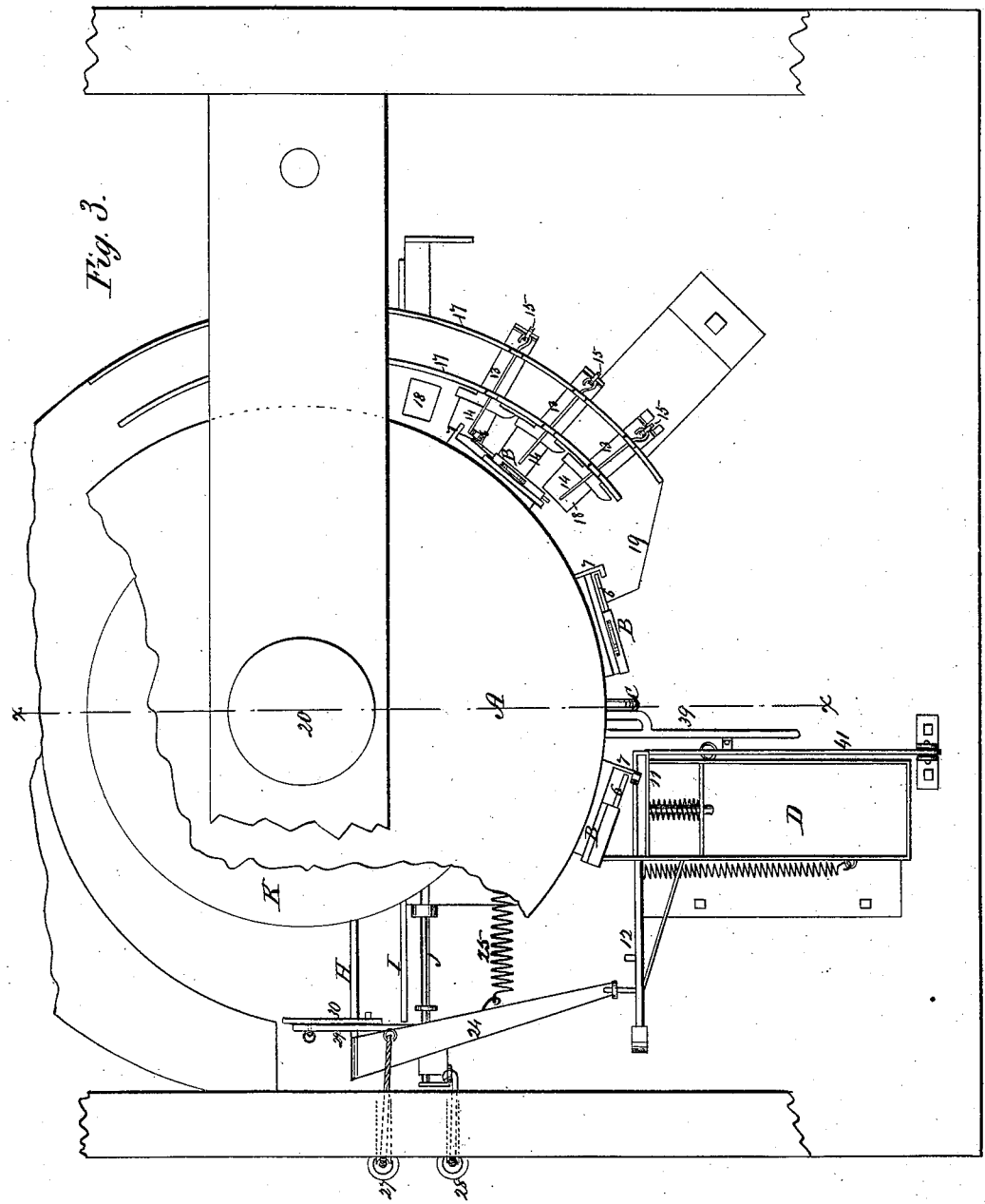
Figure 4:
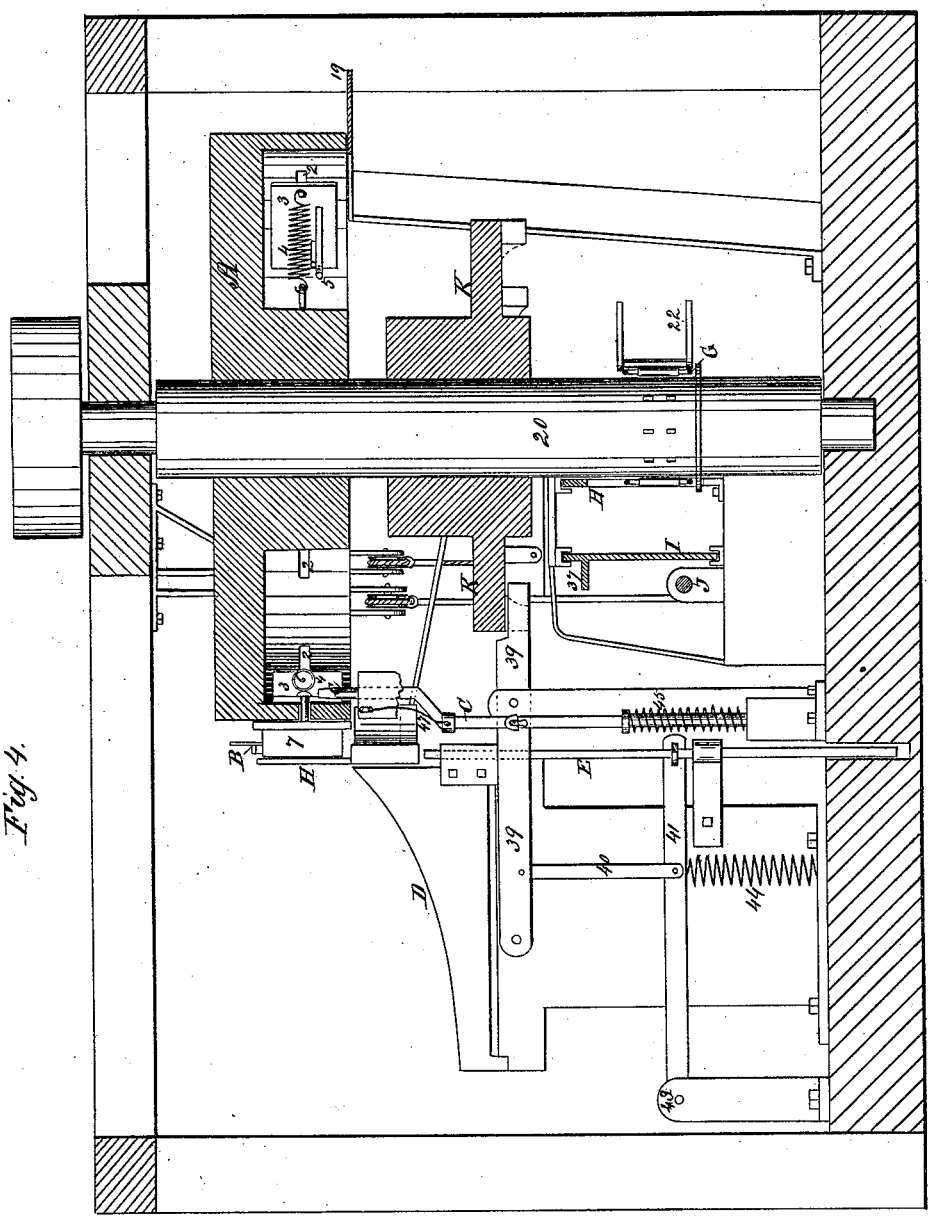

Figure 1 is a front elevation of the machine. Fig. 2 is a rear elevation of the machine. Fig. 3 is a plan view, with part of the type-carrying and ratchet wheel broken away. Fig. 4 is a vertical cross-section on line $x\,x$ of Fig. 3. Fig. 5 is a horizontal section on line $y\,y$, Fig. 1. Fig. 6 is a detail view, showing the inner end of the type-receptacle and parts connected therewith.

The invention consists in the construction and combination of devices whereby the types composing the column or page of matter to be distributed are individually and successively forced into spring clamps or holders carried by a rotating wheel, and by such holders delivered to automatic releasing mechanism, and distributed into separate receptacles.

I will state, preliminary to a detailed description of the machine, that the wheel A carries the type clamps or holders B, which receive the types as they are singly forced up by rod E, a portion of the column or page of type to be distributed being previously placed in receptacle D, and a line thereof raised by the pusher 8 into suitable position to facilitate the action of said rod. The clamps or holders B are momentarily detained by a stop-rod, C, at the time the pusher E is forcing up a type, the rim of the wheel A being slotted at the point where the holders are attached, so that the motion of the latter may not be interrupted by such arrest of the holders. The several types have differently-located notches, and as the type-holders pass around they deliver the respective types to the distributing mechanism F, the chief feature of which is a series of feelers, 13, that take into those type-notches with which they coincide in position, and are pushed back by type with whose notches they do not coincide. When there is coincidence of type-notch and position of feeler 13 the jaws of the clamp B will be opened and the type released, otherwise not. There are, of course, as many feelers 13 as there are letters in the alphabet, and no two feelers are located in the same plane.

I will now describe the machine in detail.

A is a horizontal wheel, to which a continuous rotary motion is imparted by any suitable means. The pendent rim 1 of the wheel has a series of horizontal slots, 2, to provide for attachment of the type-holders B, the same being connected to plates 3 on the inner side of the rim 1 by short bars, which pass through the slots 2, Fig. 4. The plates 3 are drawn to the right (so far as the slots permit) by springs 4, but carried to the left when the end of the stop-rod C comes in contact with a stud, 5, projecting from each of the plates 3, as will be hereinafter further described.

The said type-holders B consist of a spring-clamp, one of whose jaws is a movable slide, 6, and the other a fixed flange or rib, 7. Both parts 6 and 7 are flared outward at the bottom to adapt them to receive an individual type when forced up from the receptacle D. The latter is a horizontal oblong rectangular trough or box, suitable for the reception of a portion of a column or (book) page of the type to be distributed. A line of type is pushed up by the pusher 8, Fig. 6, which is intermittingly reciprocated in vertical guides or ways across the inner end of the receptacle D by means of the bent pivoted lever 9. When a line of type is thus raised, a horizontal spring-bar, 10, Figs. 3 and 6, is pushed under it, (by means or devices not shown,) and supports it while the rod E is acting. It is hence inclosed in the space or guideway behind the spring-pressed plate 11, and is constantly crowded toward the right by a bar or plate, 12, till all the types in the line have been forced upward singly by the rod E, which reciprocates in guides at the side of the receptacle D, and acts on each type in succession, forcing it into a holder, B, by which it is carried around to the distributing mechanism proper, F. So soon as one line of type has been thus distributed the pusher 8 forces up another, and the operation is thus made continuous, the receptacle D being successively replenished until the work of distributing is done.

The distributing mechanism proper, F, consists of a series of devices arranged concentrically with the wheel A. Each device consists of a T-shaped slide or feeler, 13, catch or stop-rod 14, lever 15, and spring 16. The slides and stop-rods work horizontally in a frame or guide, 17, are arranged parallel one above the other, and pivoted to the vertical pivoted levers 15, against which the springs 16 act, tending to draw the head of the slides back against the inner section of the frame 17. The types have each a nick or open slot cut in them; but the types for different letters have the nicks or slots differently located.

The feelers 13 are arranged in different planes, so that no feeler 13 will correspond with another in position. The respective heads of the feelers are beveled at the end nearest the receptacle D, and otherwise so shaped or constructed as to adapt them to enter the nicks or notches in the types. Hence, as the wheel A rotates and brings the type-holders B successively opposite the distributing devices, those feelers 13 where positions coincide with the nicks in the types carried by said holders will enter the nicks, and the rods 14, connected with such slides, coming at the same time in contact with the heads of the spring-jaws 6 of the holders, will momentarily arrest the jaw 6, or move it back, thus causing the types to be released, and allowing them to fall into the openings or pockets 18 in the table 19, and thereby effecting their distribution in different receptacles. On the other hand, it is obvious that such of the feelers 13 whose heads do not coincide with and enter the nicks in the types carried by the holders B will be forced back by contact with those types, causing the longer arm of the levers 15 to be thrown back, and retracting the rod 14, so that they will not come in contact with the head of the jaws 6 of the holders B.

Having now described the parts of the apparatus immediately concerned in the work of distribution, I will proceed to describe the mechanism by which the types are forced out of the receptacle D, and the holders B temporarily arrested to receive the same, while the wheel A continues its rotation.

The endless chain G passes around the toothed shaft 20 of the type-carrying wheel A and around a counter-shaft, 21. L-shaped catches 22 are pivoted to the chain. A slotted plate, H, sliding in guides parallel with the chain G, serves to temporarily restrain or hold the catches 22 in such position that the longer arms of the same will engage the cam-projection 23 on the back of plate I, which is arranged similarly to restraining-plate H. The latter has a lateral arm, 24, Fig. 3, which is connected with the pusher 12, that acts laterally against each line of type as it is raised by the bar or plate 8, as before explained. A rod, J, is arranged to slide in guides parallel to the cam-plate I, which is connected by a spring, 25, to the vertical arm 26 of said rod. The spring retracts the plate I after it has been moved toward the right by the L-catch 22 engaging the cam.

The plate H and rod J are retracted or drawn to the left by weights 27 28 attached to cords passing over pulleys, and the arm 26 of rod J has a lateral projection, 29, to which a spring-latch, 30, Fig. 3, is pivoted. Said latch engages a notch in plate H, so that the latter moves to the right, together with the rod J, until the latch 30 is released by riding up the fixed incline 37.

On the front side of the cam-plate I is a fixed incline or cam, 32, whose function (as the plate is moved toward the left) is to depress the longer arm of the bent lever 9 against the tension of the spring 33 attached to its shorter arm, thereby raising the type-line pusher 8.

The switch-plate 35 is pivoted at the higher end of incline 32, so that the end of the bent lever first comes in contact with it before encountering the latter, 32. After passing around the lower end of the incline, the end of the lever rises and passes back between the flange 37 and the switch-plate 35, whose spring allows it to yield for that purpose.

Below the type-carrying wheel A, on the same shaft 20, is keyed the smaller notched or ratchet wheel K. A horizontal pivoted detent-lever, 39, engages the notched rim of this wheel, and its outer end is connected by a link, 40, with the lever 41, which is pivoted at its respective ends to a fixed point, 43, and the vertical rod E. A strong spring, 44, holds the lever 41 down.

The rod C, by which the type-holders B are momentarily arrested in order that they may receive the types when pushed up by rod E, is encircled by a spring, 45, which also supports it until depressed by the lever 41, which is effected in this wise: A spring-catch, 46, is attached to the rod C, and when a tooth of wheel K depresses the inner end of lever 39 the catch passes under it on the other side of its pivot, and as the lever escapes or passes off from the tooth of the wheel the spring 44 draws it down, and thereby depresses the rod C. But as the rod C is pressed down the spring-catch 46 is drawn back by the cord 47, attached to the standard 48 or some other fixed point, so that the rod is at once released and again forced up by its encircling spring into position to engage the stud 5 projecting from the inner plate 3 of the next holder B.

A guard-plate, 50, may be attached to the standard 48, to act against the arm of the catch 46, and assist in forcing it out as the rod C rises.

Having thus described in detail the parts of the machine and their respective functions, I will briefly state their consecutive and combined operation.

The type-receptacle D being supposed to be full, and one line of type lifted to place, when the wheel A is turned, the stop-rod C, being up, catches and holds for a moment the plate 3, to which the type-holders B are attached, and the lever 39 under the notched wheel K, passing under a tooth of said wheel, has its outer end thrown up, thus raising the lifting-rod E and forcing a type into its holder B, and then, immediately passing the tooth or notched wheel, its outer end is drawn down by spring 44, and the lever passes above and engages the spring-catch 46 on stop-rod C, thus forcing the rod down and allowing that type-holder to pass on. But the instant the stop-rod C is down its spring-catch 46 is withdrawn by cord 47, and the stop-rod is again thrown up to catch and hold the next type-holder, and so on rapidly until the line of type is exhausted.

In the meantime the endless chain G has passed around, the tripping L-catch 22 has engaged the projection 23 on the back of cam-plate I, and carried this plate to the right along with it, the cam-plate I, through its connecting-spring 25, has drawn the latch-plate 30 along, but slower, and the latch-plate has forced the restraining-plate H to the right behind the tripping-catch L, and this restraining-plate, through its connection with the lateral pusher 12, forced it along behind the type until, when the last type in the line has been lifted, the latch 30 is also lifted out of its notch in the restraining-plate H by the stationary incline behind it, thus freeing the restraining-plate, which is instantly withdrawn by its weight. The tripping-catch L simultaneously falls back for want of support, the cam-plate I is released and drawn suddenly back by its spring 25, the end of the bent lever 9 passes under the cam or fixed incline 32, thus throwing up the pusher 8 and lifting another line of type. The mass of type in receptacle D is forced back (by a suitable device) to fill the space, and thus the operation goes on until all the type have been distributed.

Having thus described my invention, what I claim as new is—

1. In combination with the wheel A, having the pendent rim 1, provided with horizontal slots, the sliding type-holders attached to said rim, and the retracting-spring and the stop device, all constructed and arranged substantially as shown and described, to operate as specified.

2. The combination of the spring-supported stop-rod C, the spring-catch, the tripping-lever 39, the toothed wheel, the holders B, and wheel A, substantially as shown and described.

3. The combination of the ratchet-wheel, the lever 39, and vertically-sliding rod E, suitably connected with said lever, all operating for pushing an individual type between the jaws of a type-holder, substantially as shown and described.

4. The combination of the bent lever 9, the reciprocating plate provided with cam, and the type-line push-plate 8, substantially as shown and described.

5. The combination of the lateral line-pusher, working in guides across the front of the type-receptacle D, the reciprocating plate I, and restraining-plate H, connected substantially as described.

6. The combination of the lateral line-pusher, the cam-plate I, and restraining-plate H, weighted and connected substantially as specified, the rod J, the spring 25, and the L-catches, substantially as shown and described.

7. The combination of the endless chain, the L-catches pivoted thereto, the sliding cam-plate I, and slotted restraining-plate H, the locking device, the fixed incline 31, the spring 25, rod J, and lateral type-pusher, substantially as shown and described.

8. The rotating wheel A, the type-holders, having a sliding or movable jaw, the feelers 13, rods 14, and lever 15, combined as shown and described.

9. The rotating slotted rim-wheel A, the type-holders, the toothed wheel, spring-supported rod C, the detent-lever, the individual type-pusher, the type-line pusher, bent lever 9, the lateral type-pusher 12, movable cam-plate and restraining-plate, the L-catches, and sliding rod and spring 25, combined, substantially as shown and described.

The above specification of my invention signed by me this 4th day of January, A. D. 1877.

ROBERT T. P. ALLEN.

Witnesses:
A. W. OVERTON,
J. E. BARNETT.